(12) United States Patent
Sevindik et al.

(10) Patent No.: US 11,395,198 B2
(45) Date of Patent: Jul. 19, 2022

(54) COMMUNICATION MANAGEMENT SYSTEM AND HANDOFFS

(71) Applicant: Charter Communications Operating, LLC, St. Louis, MO (US)

(72) Inventors: Volkan Sevindik, Reston, VA (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 7 days.

(21) Appl. No.: 16/918,518

(22) Filed: Jul. 1, 2020

(65) Prior Publication Data

US 2022/0007241 A1 Jan. 6, 2022

(51) Int. Cl.
*H04W 36/00* (2009.01)
*H04W 36/24* (2009.01)

(52) U.S. Cl.
CPC ... *H04W 36/0072* (2013.01); *H04W 36/0094* (2013.01); *H04W 36/00837* (2018.08); *H04W 36/24* (2013.01)

(58) Field of Classification Search
None
See application file for complete search history.

(56) References Cited

U.S. PATENT DOCUMENTS

| | | | |
|---|---|---|---|
| 2008/0070576 A1* | 3/2008 | Sanders | H04W 36/08 455/436 |
| 2010/0254346 A1* | 10/2010 | Jain | H04W 36/32 370/331 |
| 2010/0296487 A1* | 11/2010 | Karaoguz | H04W 84/045 370/332 |
| 2014/0105040 A1* | 4/2014 | Baker | H04W 28/0221 370/252 |
| 2015/0304920 A1* | 10/2015 | Cootey | H04W 36/08 455/436 |
| 2020/0351739 A1* | 11/2020 | Vaidya | H04W 36/26 |

* cited by examiner

*Primary Examiner* — Kenny S Lin
(74) *Attorney, Agent, or Firm* — Armis IP Law, LLC

(57) ABSTRACT

Customer equipment establishes a wireless connection with a first wireless base station in a network environment. The first wireless base station is operative to provide the customer equipment wireless connectivity to a remote network. The customer equipment detects presence of a second wireless base station in the network environment. In response to detecting a condition such as that the first wireless base station is unable to provide a satisfactory level of communication quality to the customer equipment, the customer equipment initiates a handoff of the customer equipment to the second wireless base station via a communication to the first wireless base station. The communication mispresents a power level associated with receiving the wireless signals from the second wireless base station. The indicated power level prompts the first wireless base station to handoff the customer equipment to the second wireless base station.

35 Claims, 10 Drawing Sheets

| MONITOR INFO. 222-1 | | | |
|---|---|---|---|
| W.B.S. | REC'D COMMN. | UNIQUE IDENTITY | SIGNAL STRENGTH |
| 121 | 241 | XXY1 | -84 |
| 122 | 242 | XXY2 | -89 |
| 123 | 243 | XXY3 | -87 |
| 124 | 244 | XXY4 | -82 |
| ... | | | |

MONITOR INFO. 222-2

| W.B.S. | COMMN. | UNIQUE IDENTITY | SIGNAL STRENGTH | RANKING |
|---|---|---|---|---|
| 121 | 241 | XXY1 | -84 | 1 |
| 122 | 242 | XXY2 | -89 | 3 |
| 123 | 243 | XXY3 | -87 | 4 |
| 124 | 244 | XXY4 | -85 | 2 |
| ... | | | | |

COMMUNICATION MANAGEMENT SYSTEM AND HANDOFFS

BACKGROUND

Conventional handover events such as A1, A2, A3, A4 and A5 are used to trigger handovers of a respective mobile communication device in mobile LTE (Long Term Evolution) networks. In general, these handoff events are triggered based on the signal power levels of two wireless base stations measured by a respective mobile communication device.

For example, according to conventional techniques, user equipment (UE such as a mobile communication device) measures power levels of wireless signals from a source base station (e.g., a wireless base station to which the user equipment is currently connected) and one or more candidate handoff base stations and reports these values back to the source base station.

In fixed wireless access environments, there is no mobility. In such an instance, UEs are CPEs (Customer Premises Equipment).

CPEs are connected to a respective base station to receive DL (DownLink) traffic and UL (UpLink) traffic. CPE can receive signals from several different CBSDs in the area; and CPE connects to the CBSD from which it receives the strongest signal level. However, this method might not work well for the customer premises equipment if the CBSD is already loaded. In other words, the customer premises equipment may have to settle for poor wireless link quality even though it is connected to a wireless base station providing a strongest signal strength.

BRIEF DESCRIPTION OF EMBODIMENTS

Embodiments herein provide novel ways of providing improved wireless communications to one or more communication devices in a network environment.

For example, a wireless network environment includes customer equipment and multiple wireless base stations. The customer equipment (such as a wireless station) establishes a wireless connection with a first wireless base station in the network environment. The first wireless base station is operative to provide the customer equipment wireless connectivity to a remote network such as another wireless network, the Internet, etc. The customer equipment detects presence of a second wireless base station in the network environment. In response to detecting a condition such as that the first wireless base station is unable to provide a satisfactory level of communication quality to the customer equipment, the customer equipment initiates a handoff of the customer equipment to the second wireless base station via a communication to the first wireless base station.

In one embodiment, the communication from the customer equipment to the first wireless base station misrepresents a power level associated with the customer equipment receiving the wireless signals from the second wireless base station. In other words, in one embodiment, the communication from the customer equipment to the first wireless base station indicates that the customer equipment received wireless signals from the second wireless station (candidate wireless station) at a different power level than the wireless signals from the second wireless base station were actually received by the customer equipment.

In accordance with further example embodiments, the base station indicates that the customer equipment received wireless signals from the second wireless station (candidate wireless station) at a higher power level than the wireless signals from the second wireless base station were actually received by the customer equipment. The indicated power level prompts the first wireless base station to handoff the customer equipment to the second wireless base station.

In yet further example embodiments, the customer equipment or other suitable entity selects the power level of the received wireless signals relative to or based at least in part on a magnitude of a handoff threshold level as described herein.

Note that the handoffs as described herein can be is initiated in any suitable manner. In one embodiment, the handoff is an A-type handoff event (such as A2, A3, A5 trigger event or any other type of trigger event) in a mobile LTE (Long Term Evolution) networks.

As previously discussed, a magnitude of the power level of received wireless signals indicated by the communication from the customer equipment misrepresents an actual power level at which the customer equipment receives the wireless signals from the second wireless base station. The communication prompts the first wireless base station to execute the handoff of the customer equipment from the first wireless base station to the second wireless base station.

Further example embodiments herein include, at the customer equipment, receiving a handoff threshold value (or handoff threshold value information). The customer equipment produces the communication to indicate that the power level of the wireless signals from the second wireless base station is above the threshold value even though the customer equipment actually received the wireless signals at a power level below the threshold value.

Note that the customer equipment can receive the handoff threshold value information from any suitable resource. In one embodiment, the customer equipment receives the handoff threshold value from the first wireless base station.

In still further example embodiments, the customer equipment detects presence of the second wireless base station. In one embodiment, detecting the presence of the second wireless base station includes: at the customer equipment, receiving the wireless signals from the second wireless base station; the wireless signals indicate an identity of the second wireless base station. Accordingly, the customer equipment knows an identity of the second wireless base station. In one embodiment, the customer equipment communicates an identity of the second wireless base station to the first wireless base station.

Yet further example embodiments herein include, via the customer equipment, scanning the network environment. Based on the scanning, the customer equipment detects presence of a set of one or more (handoff) candidate wireless base stations in the network environment. The set of detected wireless base stations includes the second wireless base station and potentially other wireless base stations in which to initiate a handoff. Further embodiments herein include, via the customer equipment, ranking the wireless base stations in the set based on a signal strength of receiving respective wireless communications from each of the wireless base stations in the set.

In still further example embodiments, the customer equipment selects the second wireless base station from the set based on a magnitude of a respective power level of the customer equipment receiving wireless communications from the second wireless base station relative to magnitude of power levels of wireless communications received from the other wireless base stations in the set.

Still further example embodiments herein include, at the customer equipment, retrieving load information indicating a degree of congestion associated with the first wireless base station communicating in the network environment with other wireless stations. Via the load information, the customer equipment is notified of whether or not the first wireless base station experiences congestion communicating with other wireless stations such as multiple mobile communication devices. Congestion experienced by the first wireless base station reduces a wireless link quality that the first wireless base station supports with the customer equipment. In one embodiment, in response to the customer equipment detecting that the amount of congestion experienced by the first wireless base station is above a threshold value, or simply just unacceptable to a user of the customer equipment, the customer equipment initiates the handoff to a different base station based on the degree of detected congestion.

In one embodiment, the wireless network environment including the customer equipment, the first wireless base station, and the second wireless base station communicate via allocated CBRS (Citizens Band Radio Service) bandwidth from a spectrum access system or other suitable entity.

Further embodiments herein include establishing a wireless connection between the first wireless base station and the customer equipment in a network environment, the first wireless base station operative to provide the customer equipment wireless connectivity to a remote network; receiving a communication from the customer equipment, the communication indicating a power level associated with the customer equipment receiving wireless signals from the second wireless base station; and in response to receiving the communication, initiating a handoff of the customer equipment from the first wireless base station to a second wireless base station In a similar manner as previously discussed, in further example embodiments, a magnitude of the power level indicated by the communication misrepresents an actual power level at which the customer equipment receives the wireless signals from the second wireless base station. The communication prompts the first wireless base station to execute the handoff of the customer equipment to the second wireless base station. The customer equipment produces the communication to indicate that the power level of the wireless signals from the second wireless base station is above a threshold value. The customer equipment receives the wireless signals at a power level below the threshold value.

Yet further, as previously discussed, the handoff a threshold value can be distributed in any suitable manner. In one embodiment, the first wireless base station communicates the handoff threshold value from the first wireless base station to the customer equipment.

Detecting the presence of the second wireless base station by the first wireless base station includes: receiving the wireless signals from the second wireless base station, the wireless signals indicating an identity of the second wireless base station.

In still further example embodiments, the first wireless base station communicates load information to the customer equipment; the load information indicates a degree of congestion associated with the first wireless base station communicating in the network environment with other wireless stations. The customer equipment or other suitable entity initiates the handoff based on the degree of congestion.

Embodiments herein are useful over conventional techniques because it provides a unique way for the customer equipment to initiate a respective handoff from one wireless base station to another.

Further Embodiments

Handover events such as A1, A2, A3, A4 and A5 are used to trigger handover in mobile LTE networks. These events are triggered based on the signal power levels of two base stations that UE can currently measure.

UE measures source and target base stations power levels and report these values back to source base station, and source base station is the one that UE is currently connected. In fixed wireless access, there is no mobility and UEs are CPEs. CPEs are connected to base station to transmit DL and UL traffic. CPE can receive signals from several different CBSDs in the area; and CPE connects to the CBSD from which it receives the strongest signal level. However, this method might not work if CBSD is already loaded. Therefore, CPE should connected to CBSD with the strongest signal first and once CPE measures the load level on CBSD, CPE can start measurement of other CBSDs' signal levels to handover.

This handover will happen with a a combination of Type A events, in a way that CPE will measure the target CBSDs one by one first and report to CBSD by adding some delta to power values so that source CBSD can trigger HO to the target CBSD. If target is not strong than source, and in this case it will never be since CPE is already connected to the strongest CBSD, CPE will never HO to another CBSD. Thus, adding delta to measured target CBSD power value is a key to trigger HO.

Operational Flow:

Operation 1—CBSDs (wireless station such as a Citizens Broadband Radio Service Device) and CPE (Customer premises equipment) register with spectrum access system (bandwidth management respective 110).

Operation 2—CPE measures all CBSD signal values (RSRP values) and CPE connects to the CSDB with strongest measured power level.

Operation 3—CPE asks for load information from CBSD, and CBSD can send load information in DL (downlink) in terms of DL resource block utilization rate, average buffer sizes, etc.

Operation 4—If the load is above a threshold, CPE will start scanning for other CBSDs, and CPE will start creating the list go CBSD with strongest power to weakest.

Operation 5—CPE will measure the target CBSD power value, and checks required power threshold values set for event A5 or A2, or A3. And CPE adds a delta to satisfy these threshold for handover. CPE reports this final power value to CBSD, and CBSD will realize that HO event is trigger and will handover CPE to the target CBSD.

Operation 6—CPE will repeat steps 3-6 to handoff to another wireless base station if the current wireless base station is too loaded of if link quality of the current wireless communication link falls below a threshold value.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: establish a wireless connection between customer equipment and a first wireless base station in a network environment, the first wireless base station operative to provide the customer equipment wireless connectivity to a remote network; detect presence of a second wireless base station in the network environment; and initiate a handoff of the customer equipment from the first wireless base station to a second wireless base station via a communication to the first wireless base station, the communication indicating a power level associated with receiving wireless signals from the second wireless base station.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: establish a wireless connection between a first wireless base station and customer equipment in a network environment, the first wireless base station operative to provide the customer equipment wireless connectivity to a remote network; receive a communication from the customer equipment, the communication indicating a power level associated with the customer equipment receiving wireless signals from the second wireless base station; and in response to receiving the communication, initiating a handoff of the customer equipment from the first wireless base station to a second wireless base station Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 4 is an example diagram illustrating generation of monitor information according to embodiments herein.

FIG. 5 is an example diagram illustrating ranking of candidate wireless base stations according to embodiments herein.

Figure 1:
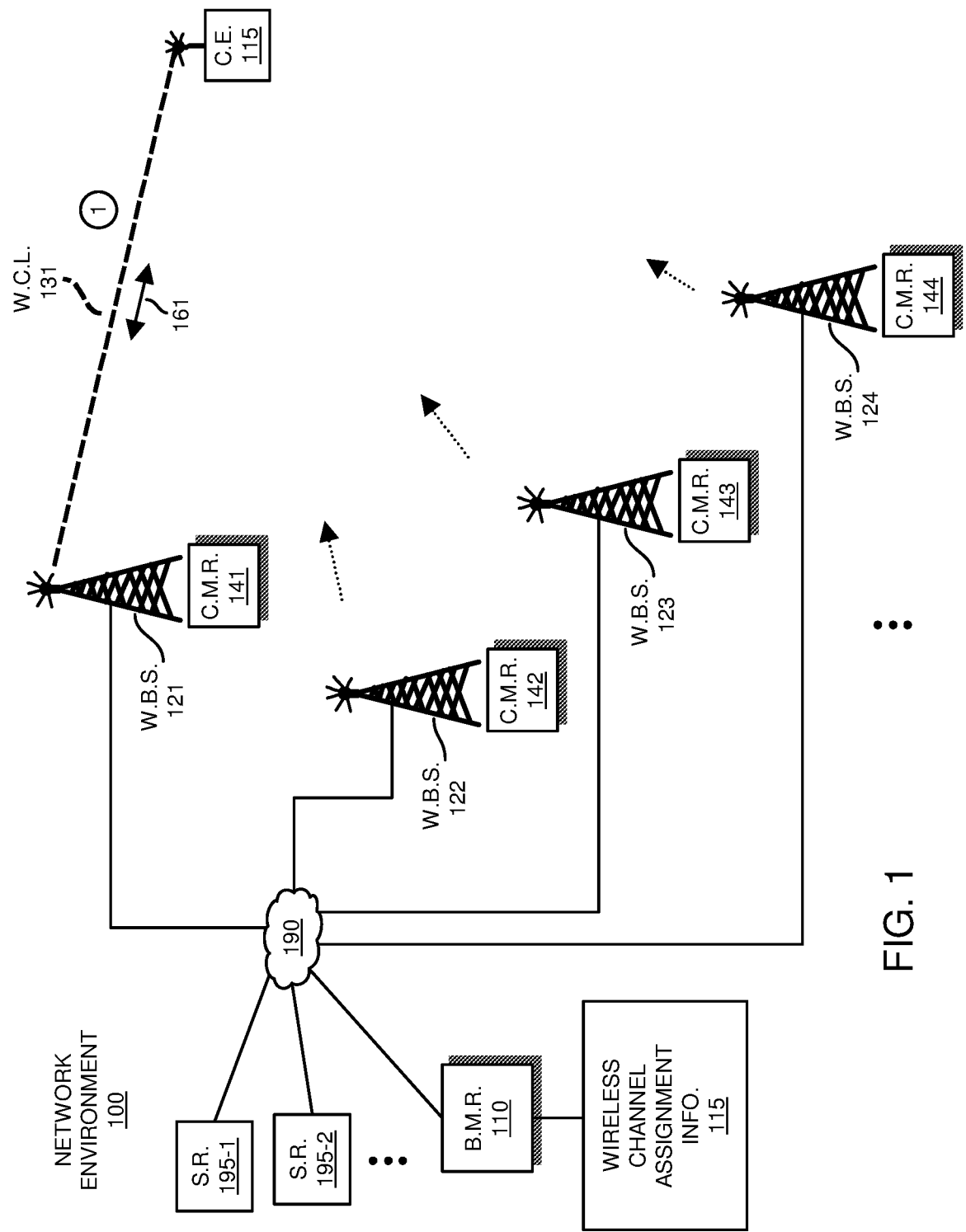
FIG. 1 is an example diagram illustrating a communication network environment and respective wireless connectivity according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A wireless station (such as customer equipment or other suitable resource) establishes a wireless connection with a first wireless base station in a network environment. The first wireless base station is operative to provide the customer equipment wireless connectivity to a remote network. The wireless station detects presence of a second wireless base station in the network environment. In response to a condition such as that the first wireless base station is unable to provide a satisfactory level of communication quality to the customer equipment, the customer equipment (i.e., fixed or mobile wireless station) initiates a handoff of the customer equipment to the second wireless base station via a communication to the first wireless base station. In one embodiment, the communication mispresents a power level associated with receiving the wireless signals from the second wireless base station. In other words, the communication indicates that the wireless station received wireless signals from a candidate wireless station higher than a respective signal strength at which the wireless signals are actually received. The falsified power level indicated by the customer equipment prompts the first wireless base station to handoff the customer equipment to the second wireless base station. Embodiments herein repeating the handoff process until the customer equipment is satisfied with a corresponding provided wireless link quality.

Now, more specifically, with reference to the drawings, FIG. 1 is an example diagram illustrating a communication network environment and respective wireless connectivity according to embodiments herein.

As shown, network environment 100 includes multiple wireless base stations including wireless base station 121, wireless base station 122, wireless base station 123, wireless base station 124, etc. Wireless network environment 100 further includes network 190, server resource 195-1, server resource 195-2, bandwidth management resource 110, and network 190.

Each wireless base station includes a respective communication management resource to manage communications between the network 190 and respective one or more communication devices (such as customer equipment, wireless station, customer premises equipment, mobile communication device, communication device operated at a fixed location, etc.). For example, in one embodiment, wireless base station 121 includes communication management resource 141 to manage communications; wireless base station 122 includes communication management resource 142 to manage communications; wireless base station 123 includes communication management resource 143 to manage communications; wireless base station 124 includes communication management resource 144 to manage communications; and so on.

Additionally, the wireless network environment 100 includes any number of customer equipment (i.e., wireless stations operated by subscribers) in communication with the one or more of the wireless base stations.

In one embodiment, the customer equipment 115 (i.e., wireless station) is disposed at a fixed location such as in a subscriber domain. Additionally, or alternatively, the customer equipment 115 is a mobile device operated by a respective user operator moving in and out of the subscriber domain.

Each of the resources in network environment 100 can be configured to include or be configured as appropriate hardware, software, or combination of hardware and software to carry out respective operations as discussed herein.

More specifically, the communication management resource 141 (and wireless base station 121) as described herein can be implemented via respective communication management hardware (wireless base station hardware), communication management software (wireless base station software), or a combination of both.

The communication management resource 142 (and wireless base station 122) as described herein can be implemented via respective communication management hardware (wireless base station hardware), communication management software (wireless base station software), or a combination of both.

The communication management resource 143 (wireless base station 123) as described herein can be implemented via respective communication management hardware (wireless base station hardware), communication management software (wireless base station software), or a combination of both.

The communication management resource 144 (wireless base station 124) as described herein can be implemented via respective communication management hardware (wireless base station hardware), communication management software (wireless base station software), or a combination of both.

Note further that the customer equipment 115 as described herein can be implemented via respective wireless station hardware, wireless station software, or a combination of both.

Bandwidth management resource 110 as described herein can be implemented via respective bandwidth management hardware, bandwidth management hardware, or a combination of both.

As shown, in operation #1, the customer equipment 115 (i.e., customer equipment) establishes a wireless communication link 131 (i.e., wireless connection) with the first wireless base station 121 in the wireless network environment 100.

Via communication management resource 141, the first wireless base station 121 provides the wireless station 121 wireless connectivity to a remote network.

As further discussed below, the customer equipment 115 may detect that the wireless communication link 115 provides poor connectivity to the remote network 190 below an acceptable threshold value. In furtherance of obtaining a better wireless connection, and or higher bandwidth connectivity to the network 190, the customer equipment 122 considers and initiates handoff connectivity with another available candidate wireless base stations such as wireless base station 122, wireless base is 123, wireless base station 124, etc.

Figure 2:
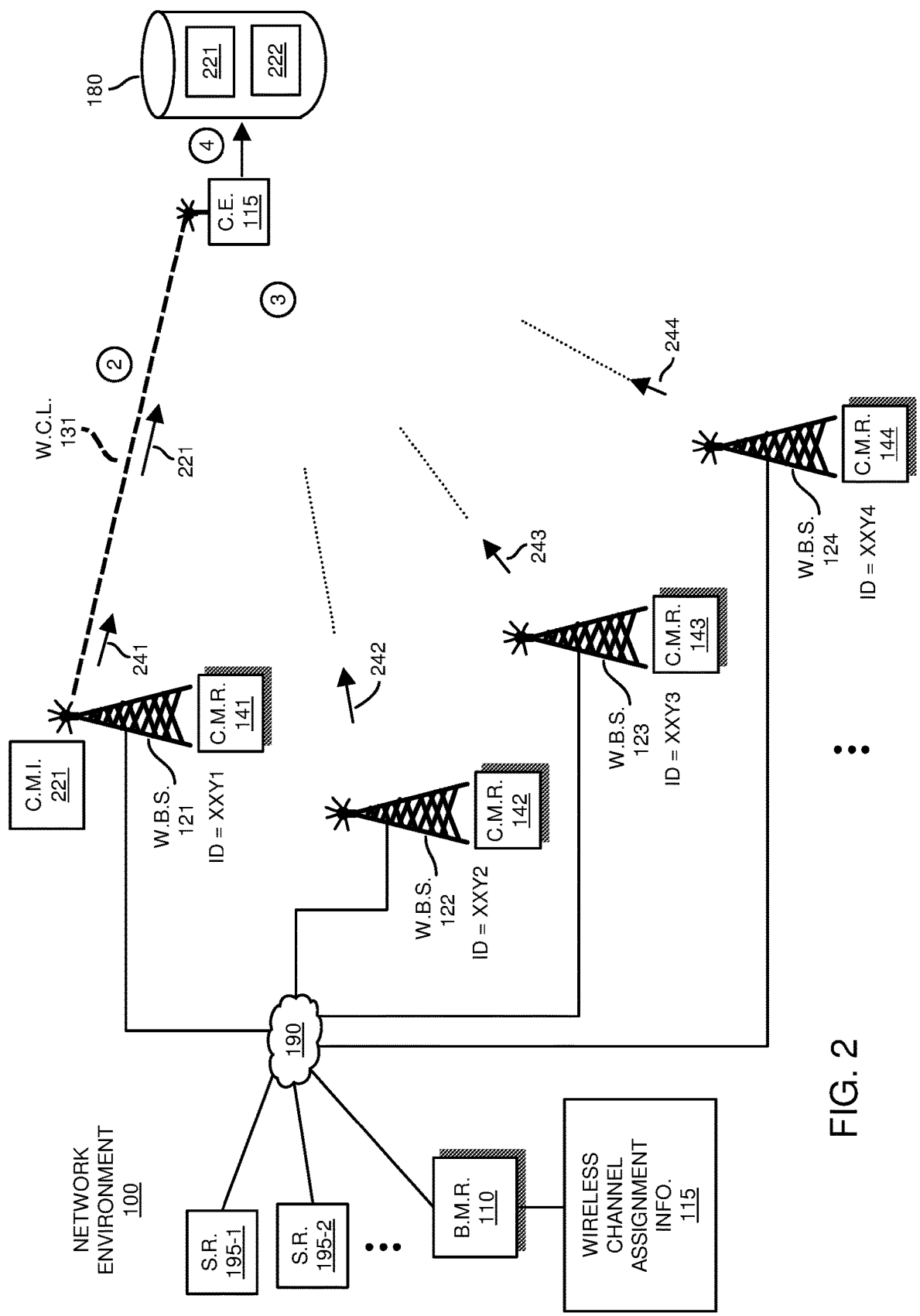
FIG. 2 is an example diagram illustrating distribution of the communication management information and monitoring of candidate wireless stations according to embodiments herein.

FIG. 2 is an example diagram illustrating distribution of the communication management information and monitoring of candidate wireless stations according to embodiments herein.

In one embodiment, via operation #2, the wireless base station 121 transmits communication management information 221 over the wireless communication link 131 to the customer equipment 115. Additionally, or alternatively, the customer equipment 115 receives the communication management information 221 from an entity other than the wireless base station 121; the customer equipment 115 generates the load information and corresponding link quality metrics associated with the wireless communication link 131, and so on.

Note that the communication management information 221 includes any suitable information facilitating connectivity of the customer equipment 115 to one or more wireless base stations and the wireless network environment 100.

More specifically, in one embodiment, the communication management information 221 includes load information associated with the wireless base station 121. Via the load information and corresponding link quality metrics(as generated by the first wireless base station, customer equipment 115, or other suitable entity), the customer equipment 115 determines a respective degree to which the wireless base station 121 is congested due to supporting wireless communications with other communication devices disposed in the wireless network environment 100.

In one embodiment, load information in the communication management information 221 indicates performance metrics associated with the wireless base station 131 such as downlink resource block utilization rate, average buffer sizes, etc. Poor performance metrics indicates that the wireless base station 121 is unable to provide proper link quality (uplink communication rate, downlink communication, low latency communications, etc.) to the customer equipment 115.

In accordance with further example embodiments, the customer equipment 115 compares the received one or more performance metrics and/or the load information to a respective one or more threshold values to determine whether the wireless base station 121 is able to provide sufficient for respective wireless communications. Additionally our alternatively, as previously discussed, the customer equipment 115 monitors attributes of the link quality associated with wireless communication link 131 and determines based on such monitoring whether the link quality is sufficient for the customer equipment 115.

Assume in this example embodiment that the customer equipment 115 detects that connectivity with the wireless base station 121 and corresponding link quality is undesirable because the wireless base station 121 and/or corresponding wireless communication link 131 is unable to provide an appropriate wireless bandwidth to support uplink and/or downlink communications, low latency communications, etc., associated with the customer equipment 115.

In such an instance, in response to detecting a condition such as that the first wireless base station 121 and/or wireless communication link 131 is unable to provide a satisfactory level of communication quality to the customer equipment 115, the customer equipment 115 performs further operation #3 to determine whether to initiate a handoff of the customer equipment to another candidate wireless base station that would be able to provide better wireless service to the customer equipment 115.

Thus, example embodiments herein include, at the customer equipment, retrieving link quality information associated with the wireless communication link 131 and/or wireless base station 121 indicating a degree of congestion associated with the first wireless base station communicating in the network environment with other wireless stations. Via the link quality information (i.e., load information), the customer equipment is notified of whether or not the first wireless base station experiences congestion communicating with other wireless stations such as multiple mobile communication devices. In one embodiment, in response to detecting that the amount of congestion experienced by the first wireless base station 121 is above a threshold value, or simply just unacceptable to the customer equipment 115, the customer equipment 115 initiates the handoff based on the degree of detected congestion. The customer equipment 115 performs the following operations to initiate a respective handoff.

Figure 3:
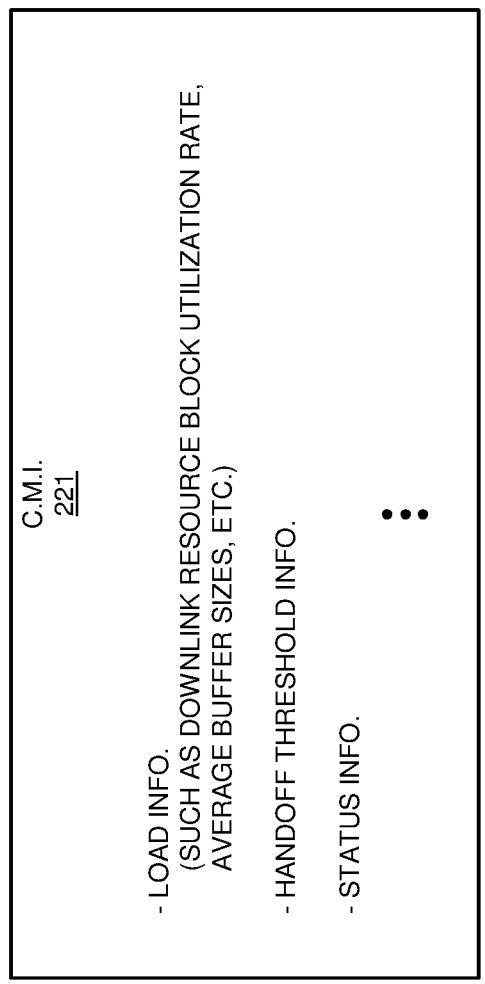
FIG. 3 is an example diagram illustrating communication management information according to embodiments herein.

FIG. 3 is an example diagram illustrating communication management information according to embodiments herein.

As shown, the communication management information 221 includes load information associated with the wireless base station 121 as previously discussed.

Additionally, the customer equipment 115 receives the handoff threshold value information, which can be receives from any suitable resource. In one embodiment, the customer equipment 115 receives one or more handoff threshold values from the first wireless base station 121. The customer equipment 115 uses the handoff threshold values to create and/or initiate one or more handoff trigger events.

Note that the handoff of wireless communication link 131 can be initiated in any suitable manner. In one embodiment, the handoff initiated by the customer equipment 115 and/or wireless base station 121 is an A-type handoff event (such as A5, A2, or A3 trigger event) in a mobile LTE (Long Term Evolution) networks.

Yet further, the communication management information 221 includes further information such as status information associated with the wireless base station 121, wireless network environment 100, other wireless base station, etc.

Referring again to FIG. 2, the customer equipment 115 stores the received communication management information 221 in the repository 180.

In response to detecting that the link quality associated with the wireless communication link 131 is below a respective threshold value as indicated by received load information and/or self-assessment, via operation #3, the customer equipment 115 monitors the network via 100 for other candidate wireless base stations.

In one embodiment, each of the wireless base stations generates and broadcasts a respective wireless signal in the wireless network environment 100. For example, the wireless base station 121 generates wireless communication 241; wireless base station 122 generates a wireless communication 242; wireless base station 123 generates wireless communication 243; wireless base station 124 generates wireless communication 244; and so on.

Each of the respective wireless communications includes an identity of the respective wireless base station transmitting the wireless communication. For example, the wireless communication 241 includes an identity XXY1 assigned to the wireless base station 121; the wireless communication 242 includes an identity XXY2 assigned to the wireless base station 122; the wireless communication 243 includes an identity XXY3 assigned to the wireless base station 123; the wireless communication 244 includes an identity XXY4 assigned to the wireless base station 124; and so on.

Accordingly, the customer equipment knows an identity of each of the wireless base stations available in the wireless network environment 100.

Based on the monitoring of the wireless network 104 and communications from respective wireless base stations, via operation #4, the customer equipment 115 generates the monitor information 222 as shown in FIG. 4 and FIG. 5.

FIG. 4 is an example diagram illustrating generation of monitor information according to embodiments herein.

In this example embodiment, in operation #3 in FIG. 2 as previously discussed, the customer equipment 115 receives communications from multiple candidate wireless base stations including wireless base station 121, wireless base station 122, wireless base station 123, wireless base station 124, etc. In operation #4, the customer equipment 115 generates and stores monitor information 222 based on the received communications.

More specifically, with reference to FIG. 4, the customer equipment 115 receives wireless communication 241 (such as one or more wireless signals) from the wireless base station 121. The communication 241 includes a unique identity value of XXY1 (such as via a PCI or Physical Cell Identity value) assigned to the wireless base station 121. Additionally, the customer equipment 115 measures a respective signal strength associated with the received wireless communication 241. Assume in this example embodiment, that the customer equipment 115 receives the communication 241 at a signal strength (such as RSRP) of −84 dBm (higher values being stronger signals). Based on the information received from monitoring and analyzing the communication 241, the customer equipment 115 stores the monitor information associated with the wireless base station 121 in the first row of monitor information 222-1.

The customer equipment 115 also receives wireless communication 242 (such as one or more wireless signals) from the wireless base station 122. The communication 242 includes a unique identity value of XXY2 (such as via a PCI or Physical Cell Identity value) assigned to the wireless base station 122. Additionally, the customer equipment 115 measures a respective signal strength associated with the received wireless communication 242. Assume in this example embodiment, that the customer equipment 115 receives the communication 242 at a signal strength (such as RSRP) of −87 dBm (a weaker signal than −84 dBm associated with communication 241). Based on the information received from monitoring and analyzing the communication 242, the customer equipment 115 stores the monitor information associated with the wireless base station 122 in the second row of monitor information 222-1.

The customer equipment 115 receives wireless communication 243 (such as one or more wireless signals) from the wireless base station 123. The communication 243 includes a unique identity value of XXY3 (such as via a PCI or Physical Cell Identity value) assigned to the wireless base station 123. Additionally, the customer equipment 115 measures a respective signal strength associated with the received wireless communication 243. Assume in this example embodiment, that the customer equipment 115 receives the communication 243 at a signal strength (such as RSRP) of −89 dBm (a weaker signal). Based on the information received from monitoring and analyzing the communication 243, the customer equipment 115 stores the monitor information associated with the wireless base station 123 in the second row of monitor information 222-1.

The customer equipment 115 receives wireless communication 244 (such as one or more wireless signals) from the wireless base station 124. The communication 244 includes a unique identity value of XXY4 (such as via a PCI or Physical Cell Identity value) assigned to the wireless base station 124. Additionally, the customer equipment 115 measures a respective signal strength associated with the received wireless communication 244. Assume in this example embodiment, that the customer equipment 115 receives the communication 244 at a signal strength (such as RSRP) of −85 dBm (a fairly strong signal). Based on the information received from monitoring and analyzing the communication 244, the customer equipment 115 stores the monitor information associated with the wireless base station 124 in the second row of monitor information 222-1.

Note that the wireless signal strength can be determined in any suitable manner. For example, the signal strength can be determined based on Reference Signals Received Power (RSRP), Reference Signal Received Quality (RSRQ), RSSI (Received Signal Strength Indicator) measurements, etc.

FIG. 5 is an example diagram illustrating ranking of candidate wireless base stations according to embodiments herein.

As shown, the customer equipment 115 sorts and prioritizes the corresponding candidate wireless base stations. For example, the customer equipment 115 ranks the wireless base station 121 as the first highest-ranking base station (most desirable) in which to establish a respective wireless communication link because it provides the best signal strength of −84 dBM.

The customer equipment 115 ranks the wireless base station 124 as the second highest-ranking base station (next most desirable) in which to establish a respective wireless communication link because it provides the second best signal strength of −85 dBm.

The customer equipment 115 ranks the wireless base station 122 as the third highest-ranking base station in which to establish a respective wireless communication link because it provides the third best signal strength of −87 dBm.

The customer equipment 115 ranks the wireless base station 124 as the fourth highest-ranking base station in which to establish a respective wireless communication link because it provides the fourth best signal strength of −89 dBm.

As shown, the customer equipment 115 produces the monitor information 222-2 to including the ranking/priority information associated with the candidate wireless base stations.

Figure 6:
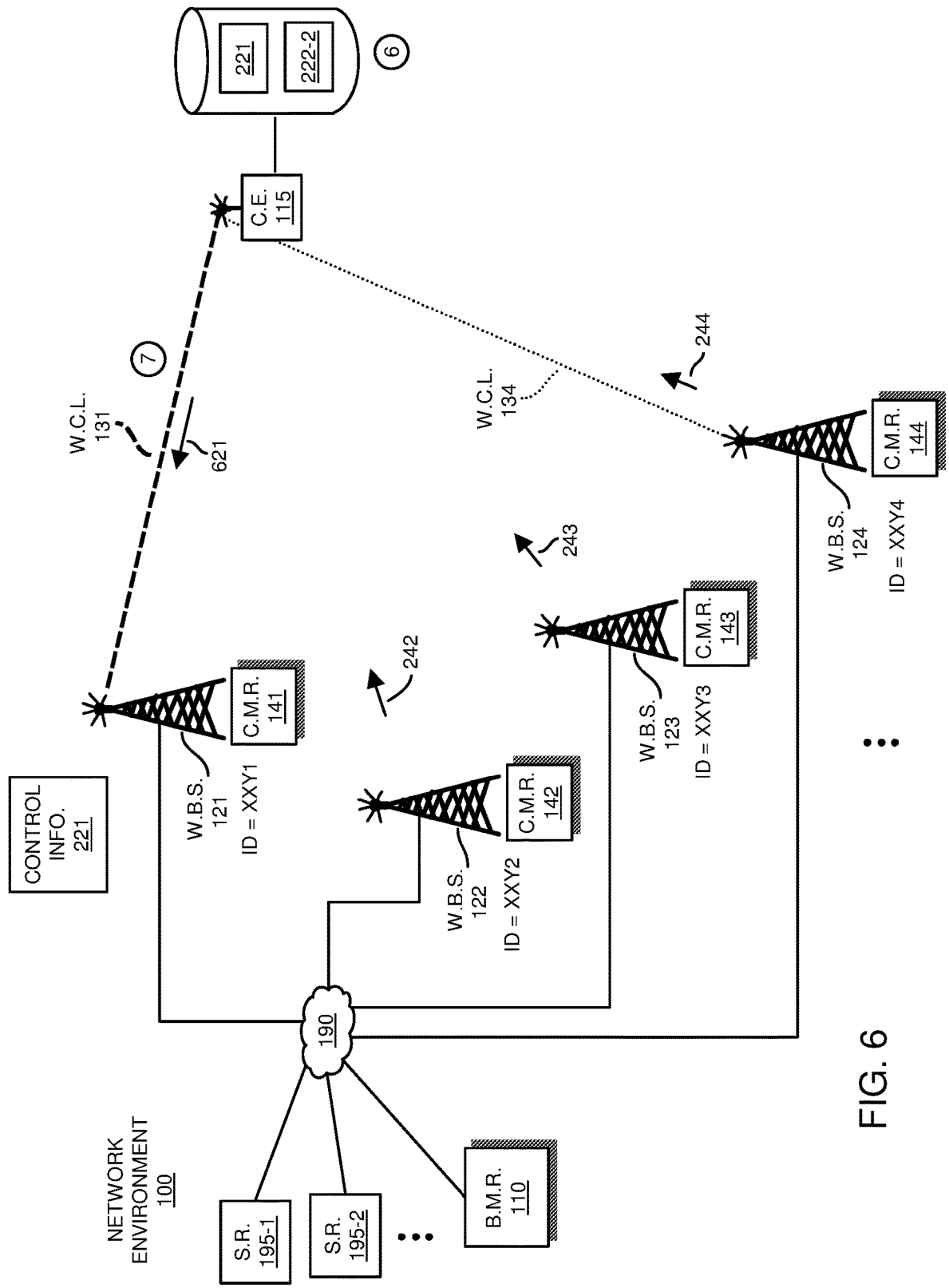
FIG. 6 is an example diagram illustrating communication of a respective handoff request from a wireless station according to embodiments herein.

FIG. 6 is an example diagram illustrating communication of a respective handoff request from a wireless station according to embodiments herein.

Via operation #6, the customer equipment 115 selects a respective target candidate wireless base station in which to perform a handoff from the source wireless base station 121.

For example, as previously discussed, the customer equipment 115 determines that the current wireless communication link 131 with the wireless base station 121 does not provide sufficient link quality. In such an instance, the customer current 115 analyzes the ranking of the different candidate wireless base stations as indicated by the monitor information 222-2. As an alternative to continued use of the wireless communication link 131 with the wireless base station 121, which is unable to provide sufficient wireless link quality, the customer equipment 115 selects another available wireless base station available in the network environment 100.

In one embodiment, the customer equipment 115 selects wireless base station 124 because it provides a next best signal strength of −85 dBm after the wireless base station 121 which provides a signal strength of −84 dBm.

In accordance with further embodiments, the communication equipment 115 generates and transmits wireless communication 621 over the wireless communication link 131 to the wireless base station 121 such as based on an A5 handoff event.

In one embodiment, the communication 621 (such as a handoff request or command) indicates a wireless power level at which the customer equipment 115 received the wireless communication 244 from the wireless base station 124. Instead of notifying the wireless base station 121 that the customer equipment 150 receives the wireless communication 244 at the actual signal strength of −85 dBm, the customer equipment as a delta value to the actual signal strength of −85 dBm to produce a falsified signal strength value of −82 dBm reported to the wireless base station 121 associated with the A5 handoff event. For example, in one embodiment, the customer equipment 115 as a delta value of 3 dBm to the signal strength −85 dBm to produce a signal strength value of −82 dBm and reports such information (−82 dBm) to the wireless base station 121. Thus, the wireless base station 124 (−82 dBm) appears to the wireless base station 121 to provide a higher signal strength to the customer equipment 115 than the wireless base station 121, which provides a signal strength of −84 dBm.

In one embodiment, the customer equipment picks the delta value to be sufficiently high such that the falsified signal strength value triggers a respective handoff (such as via trigger events A2, A3, or A5). In one embodiment, the customer equipment 115 generates the falsified signal strength communicated to the wireless base station 121 as being a value of −82 dBm instead of −85 dBm. This signal strength is greater than the signal strength −84 dBm of signals 241 from the wireless base station 121, causing a respective handoff as described herein.

In yet further example embodiments, the customer equipment 115 or other suitable entity selects the power level or delta value (in which to add to an actual received power level) relative to or based at least in part on a magnitude of a handoff threshold level as described herein. For example, if the threshold value to initiate the handoff of the customer equipment 115 to the wireless base station 124 is greater than a value of 89, the customer equipment sets the falsified value to a magnitude greater than 89 (such as 90, 91, 92, etc.) in order to initiate a respective wireless handoff.

In operation #7, via he wireless communication 621, the customer equipment 115 communicates the falsified signal strength value of −82 dBm (instead of −85 dBm) or other suitable value above a handoff threshold value (instead of actual signal strength value of −85 dBm) to the wireless base station 121 as well as a corresponding identity XXY4 of the wireless base station 124 to the wireless base station 121. In one embodiment, as previously discussed, the actual signal strength value of −85 dBm is not sufficient enough above a handoff threshold value to cause a handoff from the wireless base station 121 to the wireless base station 124. However, communication of the falsified signal strength value of −82 dBm (which is above a handoff threshold value) causes the wireless base station 121 to initiate a handoff of the wireless communication link 131 to the wireless base station 124 such that the target wireless base station 124 now provides wireless conductivity to the customer current 115 via the newly estimated wireless communication link 134.

In accordance with further example embodiments, the wireless communication link 134 supports wireless communications 761 in both uplink and downlink direction between the wireless base station 124 and the customer equipment 115, providing the customer equipment 115 connectivity to remote network 190 and corresponding communication devices.

Thus, the communication 621 from the customer equipment 115 to the first wireless base station 121 indicates that the customer equipment 115 received wireless communication 244 from the second wireless station 124 (candidate wireless station) at a different power level than the wireless communication 244 was actually received by the customer equipment 115. The indicated power level of 90 prompts the first wireless base station 121 to handoff the customer equipment 115 to the wireless base station 124.

Figure 7:
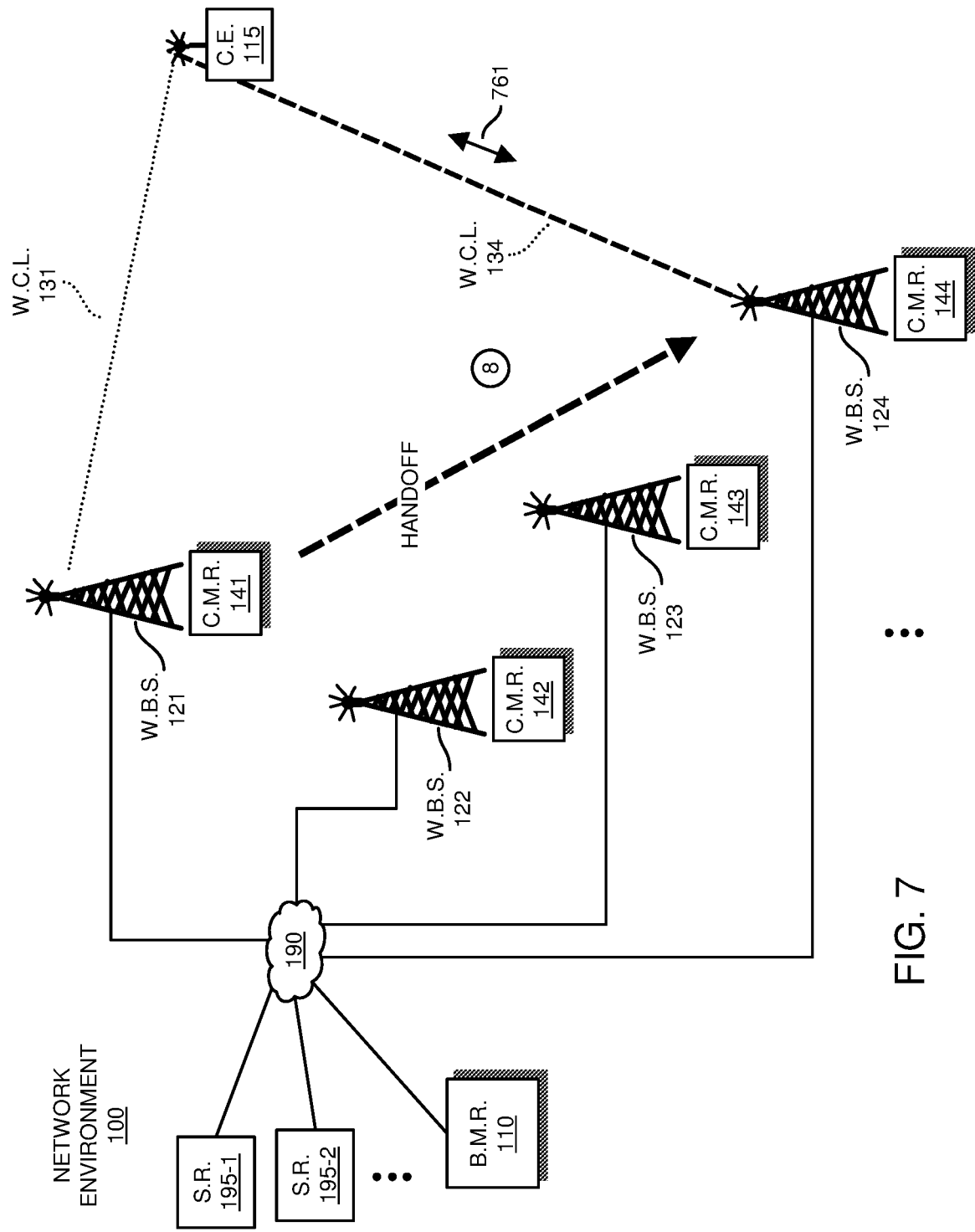
FIG. 7 is an example diagram illustrating completion of a respective handoff to a new wireless base station according to embodiments herein.

FIG. 7 is an example diagram illustrating completion of a respective handoff to a second wireless base station according to embodiments herein.

In operation #8, in response to the customer equipment 115 mispresenting the received wireless power level associated with signals from the wireless base station 124 (such as via value 90 rather than 85 as previously discussed), the wireless base station 121 facilitates a handoff of the wireless communication link 131 to the wireless base station 124. The handed off wireless communication link 131 becomes wireless communication 134 between the customer equipment 115 and the wireless base station 124.

Via continued communications 761, the wireless communication link 134 supports connectivity with the remote network 190 via respective uplink and downlink communications. As previously discussed, in one embodiment, the bandwidth management resource 110 allocates one or more wireless channels (such as from the CBRS band or other wireless bandwidth) for use by the wireless base station 144 and the customer equipment 115.

In one embodiment, wireless base station 124 repeatedly communicates (such as heartbeat signals) with the bandwidth management resource 110 (such as spectrum access system) to confirm that the allocated wireless channels can be used to support continued wireless communications with the customer equipment 115. In certain instances, a respective incumbent user having a higher priority rights may revoke use of the one or more wireless channels allocated to the wireless base station 124.

In a similar manner as previously discussed, if the customer equipment 115 is not satisfied with the uplink/downlink communication quality associated with the wireless communication link 134, the customer equipment 115 can initiate a respective handoff to another wireless base station until the customer equipment 115 is satisfied with respective communication link quality.

Figure 8:
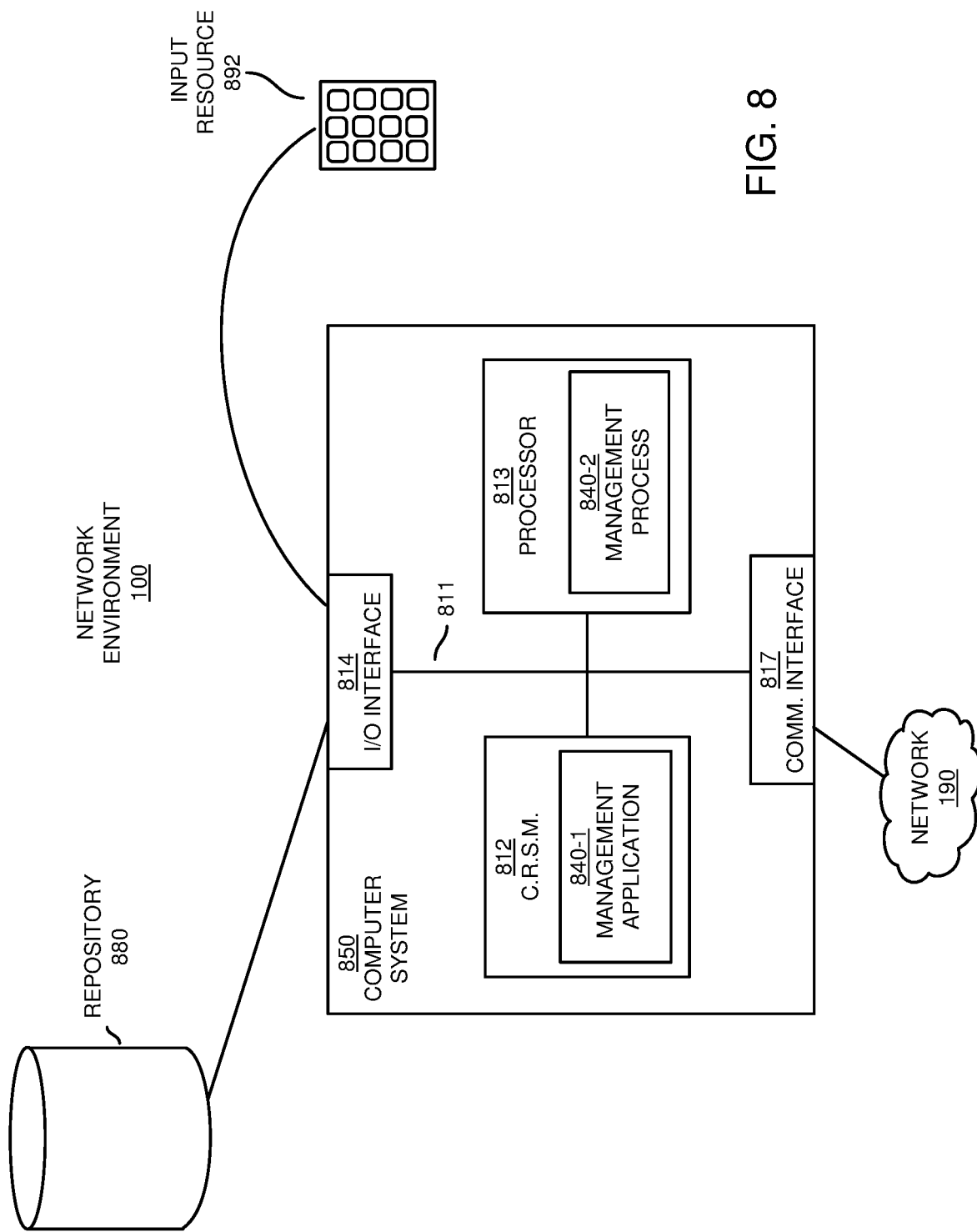
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions to carry out the different operations as discussed herein.

As shown, computer system 850 of the present example includes an interconnect 811 that coupling computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9 and 10. Note that the steps in the flowcharts below can be executed in any suitable order.

Figure 9:
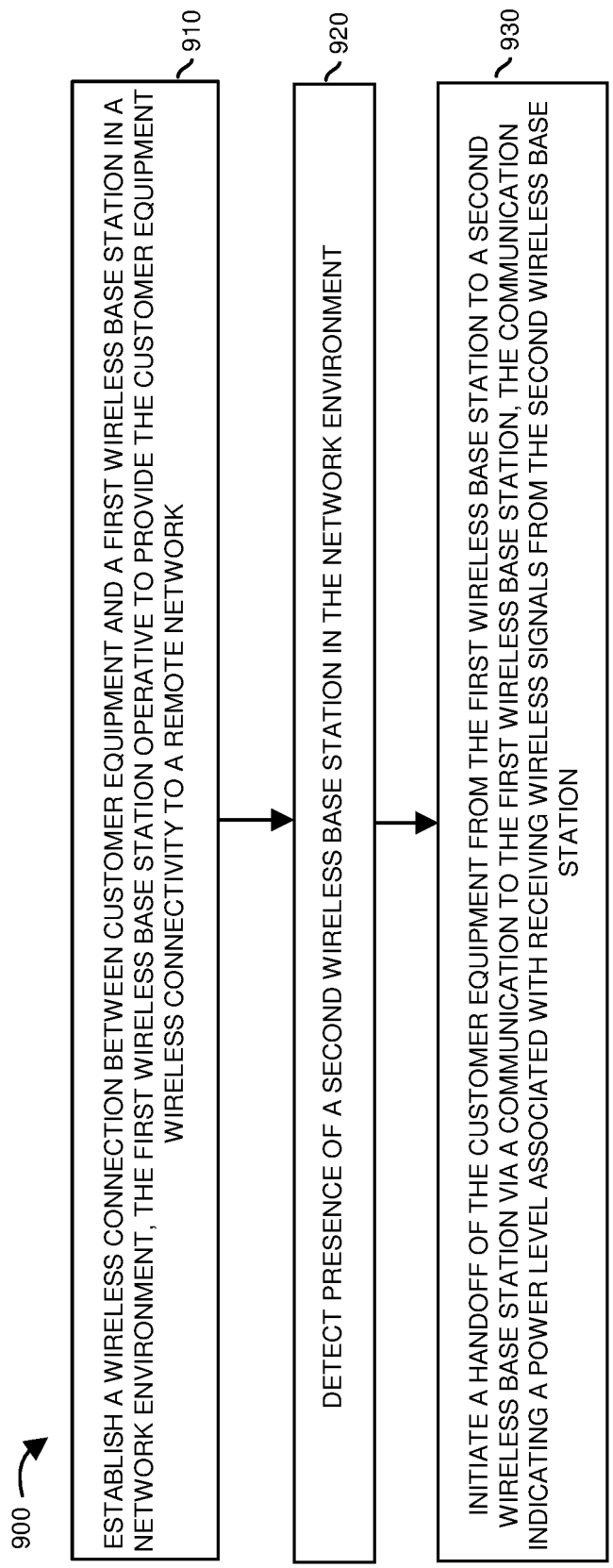
FIG. 9 is an example diagram illustrating a method according to embodiments herein.

FIG. 9 is a flowchart 900 illustrating an example method according to embodiments. Note that there will be some overlap with respect to concepts as discussed above.

In processing operation 910, the customer equipment 115 establishes a wireless connection 131 between the customer equipment 115 (such as customer equipment, mobile communication device, etc.) and a first wireless base station 121 in the network environment 100. The first wireless base station 121 provides the customer equipment 115 to a remote network 190 and other communication devices such as server resource 195-1, will server resource 195-2, etc.

In processing operation 920, the customer equipment 115 detects presence of a second wireless base station 124 in the network environment 100.

In processing operation 930, the customer equipment 115 initiates a handoff of the customer equipment 115 and corresponding wireless communication link 131 from the first wireless base station 121 to a second wireless base station 124 via a communication to the first wireless base station 121. In one embodiment, the communication from the customer equipment 115 indicates a power level associated with receiving wireless signals from the second wireless base station 124. In one embodiment, as previously discussed, a magnitude of the power level indicated by the communication from the customer equipment 115 misrepresents an actual power level at which the customer equipment 115 receives the one or more wireless signals from the second wireless base station 124. For example, the customer equipment 115 indicates receiving wireless signals from the wireless base station 124 at a higher level than a power level at which the wireless signals are actually received. This spoofs the wireless base station 121 into performing a respective handoff to the wireless base station 124 even though the wireless base station 121 provides the customer equipment 115 the highest wireless signal strength.

Figure 10:
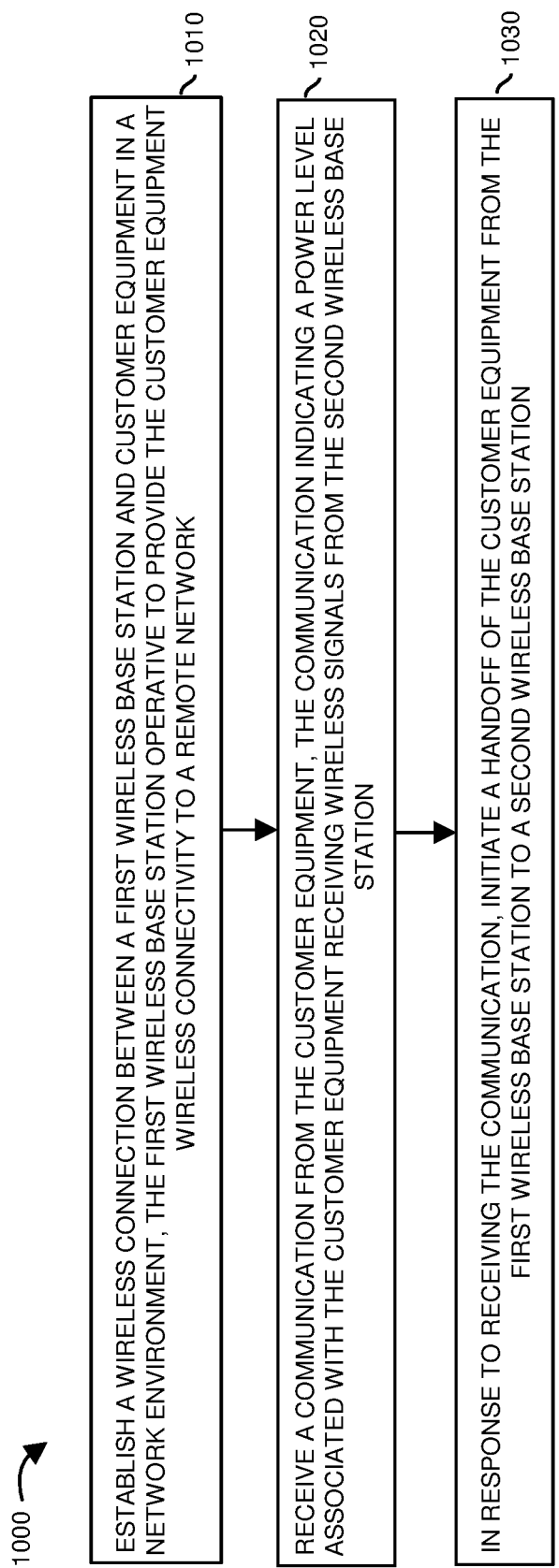
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the wireless base station 121 establishes a wireless connection between the first wireless base station 121 and customer equipment 115 in the wireless network environment 100. The first wireless base station 121 provides the customer equipment 115 wireless connectivity to a remote network 190 and corresponding communication devices.

In processing operation 1020, the wireless base station 121 receives a communication from the customer equipment 115. The communication indicates a power level associated with the customer equipment 115 receiving wireless signals from the second wireless base station 122. In one embodiment, a magnitude of the power level indicated by the communication misrepresents an actual power level at which the customer equipment receives the wireless signals from the second wireless base station. For example, the customer equipment 115 indicates receiving wireless signals from the wireless base station 124 at a higher level than a power level at which the wireless signals are actually received by the customer equipment 115.

In processing operation 1030, in response to receiving the communication, the wireless base station 121 initiates a handoff of the customer equipment from the first wireless base station 121 to a second wireless base station 124.

Note again that techniques herein are well suited to facilitate initiation of handoffs according to embodiments herein. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    at customer equipment in a network environment:
        establishing a wireless connection between the customer equipment and a first wireless base station in the network environment, the first wireless base station operative to provide the customer equipment wireless connectivity to a remote network;
        detecting presence of a second wireless base station in the network environment;
        initiating a handoff of the customer equipment from the first wireless base station to the second wireless base station via transmission of a communication to the first wireless base station, the communication indicating a power level associated with the customer equipment receiving wireless signals from the second wireless base station; and
        wherein a magnitude of the power level indicated by the communication indicates a higher power level than a corresponding power level at which the customer equipment received the wireless signals from the second wireless base station.

2. The method as in claim 1, wherein a magnitude of the power level indicated by the communication misrepresents an actual power level at which the customer equipment received the wireless signals from the second wireless base station.

3. The method as in claim 2, wherein the communication prompts the first wireless base station to execute the handoff of the customer equipment from the first wireless base station to the second wireless base station.

4. The method as in claim 1 further comprising:
    at the customer equipment, receiving a handoff threshold value; and
    producing the communication to indicate that the power level of the wireless signals from the second wireless base station is above the received handoff threshold value.

5. The method as in claim 1, wherein detecting the presence of the second wireless base station includes:
    at the customer equipment:
        receiving the wireless signals from the second wireless base station, the wireless signals indicating an identity of the second wireless base station.

6. The method as in claim 1 further comprising:
    at the customer equipment:
        scanning the network environment;
        based on the scanning, detecting presence of a set of wireless base stations in the network environment, the set of wireless base stations including the second wireless base station; and
        ranking the wireless base stations in the set based on a signal strength of receiving respective wireless communications from each of the wireless base stations in the set.

7. The method as in claim 1, wherein the handoff is initiated as an A-type handoff event in the network environment.

8. The method as in claim 1 further comprising:
    at the communication device: i) receiving notification that a performance of the first wireless base station providing wireless connectivity is poor, and ii) initiating the handoff based on the performance as indicated by the notification.

9. The method as in claim 1 further comprising:
    communicating an identity of the second wireless base station to the first wireless base station.

10. A method comprising:
    at customer equipment in a network environment:
        establishing a wireless connection between the customer equipment and a first wireless base station in the network environment, the first wireless base station operative to provide the customer equipment wireless connectivity to a remote network;
        detecting presence of a second wireless base station in the network environment; and
        initiating a handoff of the customer equipment from the first wireless base station to the second wireless base station via transmission of a communication to the first wireless base station, the communication indicating a power level associated with the customer equipment receiving wireless signals from the second wireless base station;
        the method further compromising: at the customer equipment, receiving a handoff threshold value; and
        producing the communication to indicate that the power level of the wireless signals from the second wireless base station is above the received handoff threshold value; and
        wherein the wireless signals are received by the customer equipment at a power level below the received handoff threshold value.

11. The method as in claim 10 further comprising:
    receiving the handoff threshold value from the first wireless base station.

12. A method comprising:
    at customer equipment in a network environment:
        establishing a wireless connection between the customer equipment and a first, wireless base station in the network environment, the first wireless base station operative to provide the customer equipment wireless connectivity to a remote network;
        detecting presence of a second wireless base station in the network environment; and
        initiating a handoff of the customer equipment from the first wireless base station to the second wireless base station via transmission of a communication to the first wireless base station, the communication indicating a power level associated with the customer equipment receiving wireless signals from the second wireless base station, the method further comprising:
        at the customer equipment:
            scanning the network environment;
            based on the scanning, detecting presence of a set of wireless base stations in the network environment, the set of wireless base stations including the second wireless base station;

ranking the wireless base stations in the set based on a signal strength of receiving respective wireless communications from each of the wireless base stations in the set; and selecting the second wireless base station from the set based on a magnitude of a respective power level at which the customer equipment received wireless communications from the second wireless base station.

13. A method comprising:

at customer equipment in a network environment;

establishing a wireless connection between the customer equipment and a first wireless base station in the network environment, the first wireless base station operative to provide the customer equipment wireless connectivity to a remote network;

detecting presence of a second wireless base station in the network environment; and initiating a handoff of the customer equipment from the first wireless base station to the second wireless base station via transmission of a communication to the first wireless base station, the communication indicating a power level associated with the customer equipment receiving wireless signals from the second wireless base station, the method further comprising:

at the customer equipment, retrieving load information indicating a degree of congestion associated with the first wireless base station communicating in the network environment with other wireless stations; and initiating the handoff based on the degree of congestion.

14. A method comprising:

at customer equipment in a network environment:

establishing a wireless connection between the customer equipment and a first wireless base station in the network environment, the first wireless base station operative to provide the customer equipment wireless connectivity to a remote network;

detecting presence of a second wireless base station in the network environment;

initiating a handoff of the customer equipment from the first wireless base station to the second wireless base station via transmission of a communication to the first wireless base station, the communication indicating a power level associated with the customer equipment receiving wireless signals from the second wireless base station; and wherein the customer equipment, the first wireless base station, and the second wireless base station communicate via allocated CBRS (Citizens Band Radio Service) bandwidth.

15. A method comprising:

at customer equipment in a network environment;

establishing a wireless connection between the customer equipment and a first wireless base station in the network environment, the first wireless base station operative to provide the customer equipment wireless connectivity to a remote network;

detecting presence of a second wireless base station in the network environment;

initiating a handoff of the customer equipment from the first wireless base station to the second wireless base station via transmission of a communication to the first wireless base station, the communication indicating a power level associated with the customer equipment receiving wireless signals from the second wireless base station; and at the customer equipment, selecting the power level based on a magnitude of a power threshold level.

16. A system comprising:

customer equipment in communication with a first wireless base station in a network environment, the customer equipment operative to:

establish a wireless connection between the customer equipment and the first wireless base station, the first wireless base station operative to provide the customer equipment wireless connectivity to a remote network;

detect presence of a second wireless base station in the network environment;

initiate a handoff of the customer equipment from the first wireless base station to the second wireless base station via transmission of a communication to the first wireless base station, the communication indicating a power level associated with the customer equipment receiving wireless signals from the second wireless base station; and wherein the customer equipment, the first wireless base station, and the second wireless base station communicate via allocated CBRS (Citizens Band Radio Service) bandwidth.

17. The system as in claim 16, wherein a magnitude of the power level indicated by the communication misrepresents an actual power level at which the customer equipment received the wireless signals from the second wireless base station.

18. The system as in claim 17, wherein the communication prompts the first wireless base station to execute the handoff of the customer equipment from the first wireless base station to the second wireless base station.

19. The system as in claim 16, wherein the customer equipment is further operative to:

at the customer equipment, receive a handoff threshold value; and produce the communication to indicate that the power level of the wireless signals received from the second wireless base station is above the received handoff threshold value.

20. The system as in claim 19, wherein the customer equipment receives the wireless signals at a power level below the received handoff threshold value.

21. The system as in claim 20, wherein the customer equipment is further operative to:

receive the handoff threshold value from the first wireless base station.

22. The system as in claim 16, wherein the customer equipment is further operative to:

receive the wireless signals from the second wireless base station, the wireless signals indicating an identity of the second wireless base station.

23. The system as in claim 16, wherein the customer equipment is further operative to:

scan the network environment;

based on the scanning, detect presence of a set of wireless base stations in the network environment, the set of wireless base stations including the second wireless base station; and rank the wireless base stations in the set based on a signal strength of receiving respective wireless communications from each of the wireless base stations in the set.

24. The system as in claim 23, wherein the customer equipment is further operative to:
    select the second wireless base station from the set based on a magnitude of a respective power level of the customer equipment receiving wireless communications from the second wireless base station.

25. The system as in claim 16, wherein the customer equipment is further operative to:
    retrieve load information indicating a degree of congestion associated with the first wireless base station communicating in the network environment with other wireless stations; and
    initiate the handoff based on the degree of congestion.

26. The system as in claim 16, wherein the handoff is initiated as an A-type handoff event in the network environment.

27. The system as in claim 16, wherein the customer equipment is further operative to:
    select the power level based on a magnitude of a power threshold level.

28. Computer-readable storage hardware having instructions stored thereon, the instructions, when carried out by computer processor hardware associated with customer equipment, cause the computer processor hardware to:
    establish a wireless connection between the customer equipment and a first wireless base station in a network environment, the first wireless base station operative to provide the customer equipment wireless connectivity to a remote network;
    detect presence of a second wireless base station in the network environment;
    initiate a handoff of the customer equipment from the first wireless base station to the second wireless base station via transmission of a communication to the first wireless base station, the communication indicating a power level associated with the customer equipment receiving wireless signals from the second wireless base station; and,
    wherein a magnitude of the power level indicated by the communication indicates a higher power level than a corresponding power level at which the customer equipment received the wireless signals from the second wireless base station.

29. A method comprising:
    at a first wireless base station in a network environment:
        establishing a wireless connection between the first wireless base station and customer equipment in the network environment, the first wireless base station operative to provide the customer equipment wireless connectivity to a remote network;
        receiving a communication from the customer equipment, the communication indicating a power level associated with the customer equipment receiving wireless signals from the second wireless base station; and
        in response to receiving the communication, initiating a handoff of the customer equipment from the first wireless base station to the second wireless base station in the network environment;
        wherein a magnitude of the power level indicated by the communication indicates a higher power level than a corresponding power level at which the customer equipment received the wireless signals from the second wireless base station.

30. A method comrising:
    at customer equipment in a network environment:
        establishing a wireless connection between the customer equipment and a first wireless base station in the network environment, the first wireless base station operative to provide the customer equipment wireless connectivity to a remote network;
        detecting presence of a second wireless base station in the network environment;
        initiating a handoff of the customer equipment from the first wireless base station to the second wireless base station via transmission of a communication to the first wireless base station, the communication indicating a power level associated with the customer equipment receiving wireless signals from the second wireless base station;
        wherein detecting presence of the second wireless base station includes: detecting that the wireless signals from the second wireless base station are received at a first wireless power level; and
        wherein the power level indicated in the communication is a second wireless power level, the second wireless power level being different than the first wireless power level.

31. The method as in claim 30 further comprising:
    at the customer equipment, producing the second wireless power level to be greater than a handoff threshold value, which causes the handoff of the customer equipment from the first wireless base station to the second wireless base station.

32. The method as in claim 30 further comprising:
    producing the second wireless power level to be greater than the first wireless power level.

33. The method as in claim 32, wherein the customer equipment notifies the first wireless base station that the customer equipment received the wireless signals at the second wireless power level instead of the first wireless power level to initiate the handoff of the customer equipment to the second wireless base station.

34. The method as in claim 30, wherein the customer equipment applies a delta value to the first wireless power level to produce the second wireless power level.

35. A method comprising:
    at customer equipment in a network environment:
        establishing a wireless connection between the customer equipment and a first wireless base station in the network environment, the first wireless base station operative to provide the customer equipment wireless connectivity to a remote network;
        detecting presence of a second wireless base station in the network environment;
        initiating a handoff of the customer equipment from the first wireless base station to the second wireless base station via transmission of a communication to the first wireless base station, the communication indicating a power level associated with the customer equipment receiving wireless signals from the second wireless base station; and
        wherein the indicated power level in the communication from the customer equipment to the first wireless base station is a falsified power level value produced by the customer equipment.

* * * * *

UNITED STATES PATENT AND TRADEMARK OFFICE
CERTIFICATE OF CORRECTION

PATENT NO. : 11,395,198 B2
APPLICATION NO. : 16/918518
DATED : July 19, 2022
INVENTOR(S) : Volkan Sevindik and Haider H. Syed It is certified that error appears in the above-identified patent and that said Letters Patent is hereby corrected as shown below:

In the Claims

Column 18, Line 33, Claim 10, replace "compromising", with --comprising--
Column 18, Line 48, Claim 12, replace "first,", with --first--
Column 19, Line 11, Claim 13, replace "environment;", with --environment:--
Column 19, Line 55, Claim 15, replace "environment;", with --environment:--
Column 21, Line 38, Claim 28, replace "and,", with --and--
Column 22, Line 1, Claim 30, replace "comrising", with --comprising--

Signed and Sealed this
Ninth Day of April, 2024

Katherine Kelly Vidal
*Director of the United States Patent and Trademark Office*